US008831432B2

(12) United States Patent
Tang et al.

(10) Patent No.: US 8,831,432 B2
(45) Date of Patent: Sep. 9, 2014

(54) TWO-CHANNEL COMPACT SMALL FORM-FACTOR PLUGGABLE MODULE

(75) Inventors: Norman Tang, Los Altos, CA (US); Liang Ping Peng, Santa Clara, CA (US); David Lai, Mountain View, CA (US); Anthony Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 13/403,340

(22) Filed: Feb. 23, 2012

(65) Prior Publication Data
US 2013/0223484 A1 Aug. 29, 2013

(51) Int. Cl.
*H04B 10/00* (2013.01)
(52) U.S. Cl.
USPC ........... 398/138; 398/135; 398/139; 375/219; 455/73
(58) Field of Classification Search
CPC .... H04B 2001/38; H04B 1/38; H04B 1/3827; H04B 1/40; H04B 1/48; H04B 3/23; G06F 13/00; G06F 3/00; H01R 24/00; H01R 13/66; H04L 27/2601
USPC ......... 398/139, 138, 135, 130, 128, 140, 141, 398/164; 375/219, 220; 455/73, 81, 88
See application file for complete search history.

(56) References Cited

U.S. PATENT DOCUMENTS

| 7,062,177 | B1 * | 6/2006 | Grivna et al. ................. 398/162 |
| 7,149,397 | B2 | 12/2006 | Popovic et al. |
| 8,499,103 | B2 * | 7/2013 | Carter et al. .................... 710/11 |
| 2008/0316729 | A1 * | 12/2008 | Rothermel et al. ........... 361/813 |
| 2009/0257754 | A1 | 10/2009 | Theodoras, II et al. |
| 2011/0135312 | A1 * | 6/2011 | El-Ahmadi et al. .......... 398/135 |
| 2012/0233368 | A1 * | 9/2012 | Alshinnawi et al. .......... 710/301 |

* cited by examiner

*Primary Examiner* — M. R. Sedighian
(74) *Attorney, Agent, or Firm* — Edell, Shapiro & Finnan, LLC (57) ABSTRACT

An apparatus and method are provided for two-channel bidirectional communications between devices for enhanced data signals. In particular, the techniques describe a first transceiver channel configured to receive first data communications from a first transceiver port. A second transceiver channel is also configured to receive second data communications from a second transceiver port. A set of signal pins are configured to receive the first data communications from the first transceiver port at a first group of signal pins and to receive the second data communications from the second transceiver port at a second group of signal pins. The first group of signal pins comprises signal pins in a signal-signal-ground configuration and the second group of signal pins comprises signal pins in a ground-signal-signal-ground configuration.

20 Claims, 9 Drawing Sheets

TWO-CHANNEL COMPACT SMALL FORM-FACTOR PLUGGABLE MODULE

TECHNICAL FIELD

The present disclosure relates to bidirectional enhanced communications between communication devices.

BACKGROUND

Enhanced data signals are increasingly deployed in data centers and carrier networks environments. For example, signals having data rates of ten gigabits (10 G) per second have become prevalent across numerous applications. It is expected that the use of 10 G signals will increase in the future. Thus, rapid adoption of high-port density networking equipment is in high demand. Additionally, there is a high demand for networking equipment that will enable the growth path from 10 G to 40 gigabit per second (40 G) signals and from 40 G to 100 gigabits per second (100 G) signals to be used in data centers and carrier network environments.

DESCRIPTION OF EXAMPLE EMBODIMENTS

Overview

An apparatus and method are provided for two-channel bidirectional communications between devices for enhanced data signals. In particular, the techniques describe a first transceiver channel configured to receive first data communications from a first transceiver port. A second transceiver channel is also configured to receive second data communications from a second transceiver port. A set of signal pins are configured to receive the first data communications from the first transceiver channel at a first group of signal pins and to receive the second data communications from the second transceiver channel at a second group of signal pins. The first group of signal pins comprises signal pins in a signal-signal-ground configuration and the second group of signal pins comprises signal pins in a ground-signal-signal-ground configuration.

Example Embodiments

Figure 1:
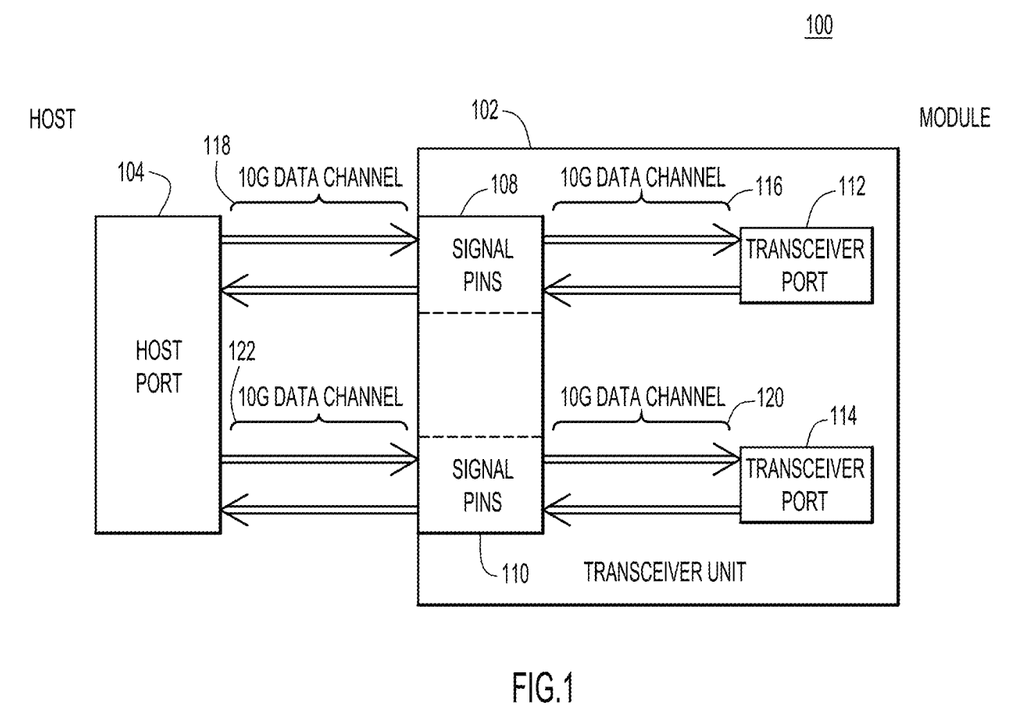
FIG. 1 is an example topology of a two-channel enhanced small form-factor pluggable (SFP+) form-factor transceiver unit configured to enable enhanced data signal communications between a plurality of fiber or copper transceiver ports and a host port.

The techniques described herein provide a two channel form-factor transceiver unit to enable enhanced bidirectional communications between communication devices. An example topology is illustrated in FIG. 1. The topology 100 comprises a transceiver unit 102 and a host port 104. The transceiver unit 102 has a set of signal pins, shown at reference numeral 106. The set of signal pins 106 has a first group of signal pins, shown at reference numeral 108, and a second group of signal pins, shown at reference numeral 110. The transceiver unit 102 also has a first transceiver port 112 and a second transceiver port 114.

The transceiver unit 102 is configured to receive fiber or copper transmission media at the first transceiver port 112 and the second transceiver port 114. Each of these transceiver ports is configured to send and receive signals at enhanced data rates to and from the host port 104. Thus, the transceiver unit 102 is configured to communicate with the host port 104 at enhanced data rates. For example, the transceiver unit 102 is configured to send and receive data to and from the host port 104 at data rates compliant with the ten gigabit Ethernet standard (herein "10 G," "10 G signals" or "10 G communications"), according to the techniques described herein after.

As shown in FIG. 1, 10 G signals are sent from the first transceiver port 112 to the first group of signal pins 108 across a first transceiver data path, shown at reference numeral 116. These 10 G signals are then sent to the host port 104 from the first set of signal pins 108 across a first host data path, shown at reference numeral 118. Similarly, 10 G signals are sent from the second transceiver port 114 to the second group of signal pins 110 across a second transceiver data path, shown at reference numeral 120. These 10 G signals are then sent to the host port 104 from the second set of signal pins 110 across a second host path, shown at reference numeral 122.

Data signals can also be sent from the host port 104 to the transceiver unit 102 (and ultimately to the first transceiver port 112 and the second transceiver port 114). For example, 10 G signals may be sent from the host port 104 (e.g., originating from communication devices, not shown in FIG. 1, electrically connected to the host port 104) to the transceiver unit 102 across the first host data path 118. The transceiver unit 102 receives these 10 G signals at the first group of signal pins 108 and sends these 10 G signals to the first transceiver port 112 across the first transceiver data path 116. Similarly, 10 G signals may be sent from the host port 104 to the transceiver unit 102 across the second host data path 122. The transceiver unit 102 receives these 10 G signals at the second group of signal pins 110 and sends these 10 G signals to the second transceiver port 114 across the second transceiver data path 120.

For reference, FIG. 1 shows a module side of the topology 100 and a host side of the topology 100. As described hereinafter, 10 G communications can be sent from the module side of the topology 100 to the host side of the topology 100. Likewise, 10 G communications can be sent from the host side of the topology 100 to the module side of the topology 100. The communications from the transceiver unit 102 to the host port 104 are referred to hereinafter as "module communications" or "module-to-host communications." Likewise, communications from the host port 104 to the transceiver unit 102 are referred to hereinafter as "host communications" or "host-to-module communications." By providing the module-to-host communications and the host-to-module communications, the transceiver unit 102 enables bidirectional communications of enhanced data signals (e.g., 10 G signals) between the transceiver unit 102 and the host port 104 across multiple (e.g., two) data paths or data channels.

It should be appreciated that, in one example, the transceiver unit 102 is configured as an enhanced compact small form-factor pluggable (CSFP+) transceiver unit that is configured to be electrically connected to two 10 G signal interfaces on the module side of the topology 100 and to act as a single pluggable module on the host side of the topology 100. For example, a first 10 G signal interface may be connected to the first transceiver port 112 of the CSFP+ transceiver unit, and a second 10 G signal interface may be connected to the second transceiver port 114 of the CSFP+ transceiver unit. When plugged into the CSFP+ transceiver unit, the 10 G signal interfaces may transmit 10 G data signals to the host port 104 across a first data channel (e.g., the first transceiver data path 116 and the first host data path 118) and a second data channel (e.g., the second transceiver data path 120 and the second host data path 122).

The transceiver unit 102 is referred to hereinafter as a "CSFP+ transceiver unit 102." It should be appreciated, however, that the transceiver unit 102 may be any other transceiver unit configured to interface with any form-factor transceiver modules to deliver bidirectional enhanced signals to and from the host port 104. For simplicity, the techniques are described hereinafter in reference to the CSFP+ implementation.

It should also be appreciated that though FIG. 1 shows two transceiver ports, any number of transceiver ports configured to interface with any number of transceiver modules may be present in topology 100. Similarly, and number of transceiver data channels and host data channels may be present for bidirectional communications of enhanced signals between the transceiver unit 102 and the host port 104. However, it should be appreciated that the transceiver unit 102 is used as a single pluggable module conforming to a certain form factor (e.g., CSFP+).

Figure 2:
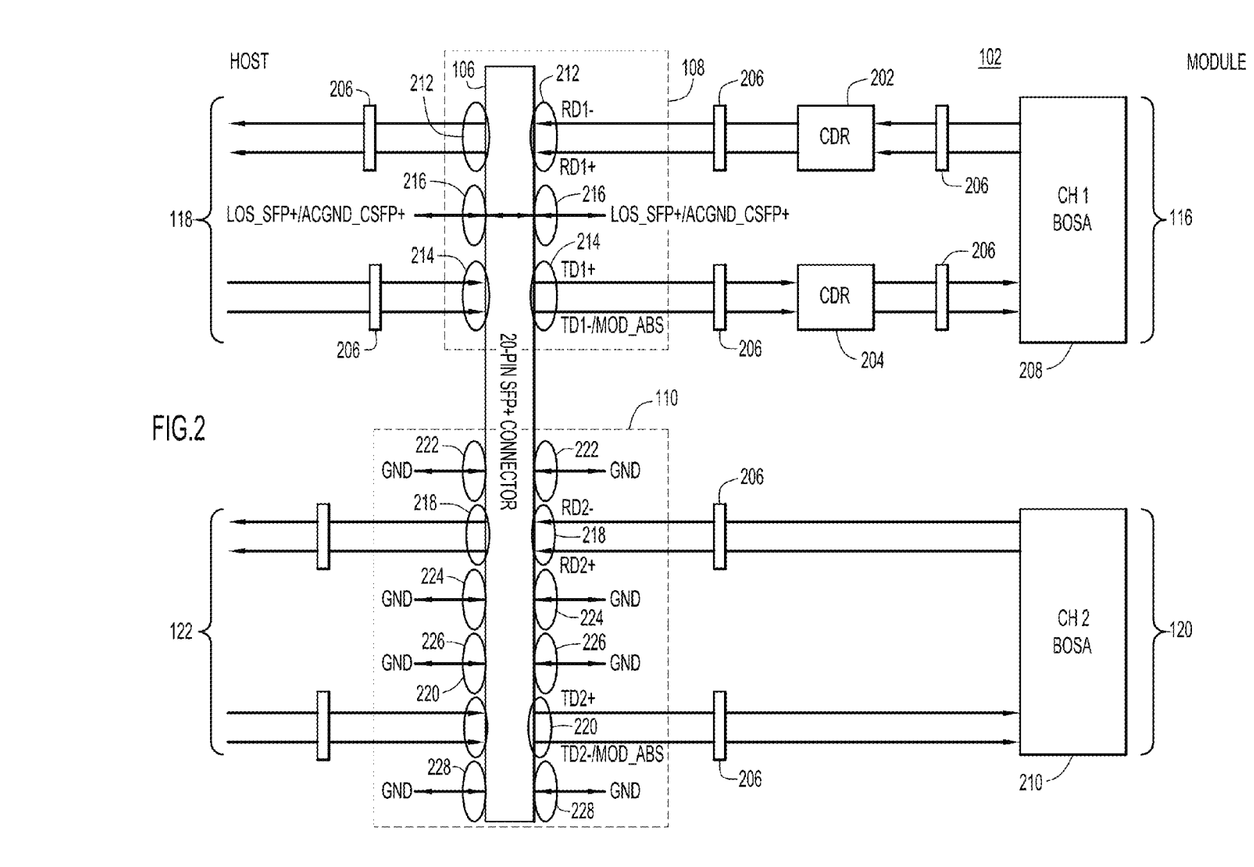
FIG. 2 is an example diagram showing the architecture of the transceiver unit.

Reference is now made to FIG. 2, which shows an example diagram showing the architecture of the CSFP+ transceiver unit 102. As stated above, the CSFP+ transceiver unit 102 comprises the set of signal pins 106, which is depicted in FIG. 2 as a 20-pin SFP+ connector. It should be appreciated that the 20-pin SFP+ connector is shown as an example, and that other connector pins may be used for the set of signal pins 106. For simplicity, the signal pins 106 are referred to hereinafter as the "20-pin SFP+ connector 106." The 20-pin SFP+ connector 106 has twenty pins that are configured to provide electrical connections to the first transceiver port 112, the second transceiver port 114 and the host port 104. In one example, the first transceiver port 112 is electrically connected to the first group of signal pins 108, the second transceiver port 114 is electrically connected to the second group of signal pins 110, and the host port 104 is electrically connected to both the first group of signal pins 108 and the second group of signal pins 110 (e.g., via a first physical layer (PHY) or processor of the host port 104 and a second physical layer (PHY) or processor of the host port 104, respectively).

FIG. 2 also shows the first transceiver data path 116, the first host data path 118, the second transceiver data path 120, and the second host data path 122. Each of these data paths allows for bidirectional 10 G data communications to enable module-to-host communications and host-to-module communications over the data paths.

The first transceiver data path 116 comprises a first clock data recovery (CDR) unit 202, a second CDR unit 204, a plurality of direct current (DC) blocking capacitors 206 and a first bi-directional optical sub-assembly (BOSA) unit 208. In one example, the DC blocking capacitor may have a capacitance of 0.1 micro-Farads. The first host data path 118 comprises the DC blocking capacitors 206. The second transceiver data path 120 comprises the DC blocking capacitors 206 and a second BOSA unit 210. The first BOSA unit 208 is coupled to the first transceiver port 112 (not shown), and the second BOSA unit 210 is coupled to the second transceiver port 114 (not shown).

For module-to-host communications between the CSFP+ transceiver unit 102 and the host port 104, 10 G signals are sent from the first transceiver port 112 (originating from a first far end 10 G signal transceiver module) to the first BOSA unit 208. Similarly, 10 G signals are sent from the second transceiver port 112 (originating from a second far end 10 G signal transceiver module) to the second BOSA unit 210. The first transceiver data path 116 carries the 10 G signals from the first BOSA unit 208 to the first group of signal pins 108 of the 20-pin SFP+ connector 106. These signals are sent to the host port 104 from the first group of signal pins 108 across the first host data path 118. The second transceiver data path 120 carries the 10 G signals from the second BOSA unit 210 to the second group of signal pins 110 of the 20-pin SFP+ connector unit 106. These signals are sent to the host port 104 from the second group of signal pins 110 across the second host data path 122. Thus, in the module-to-host direction, the CSFP+ transceiver unit 102 enables two-channel 10 G communications from the SFP+ transceiver modules to the host port 104.

For host-to-module communications between the host port 104 and the CSFP+ transceiver unit 102, 10 G signals are sent from the host port 104 (e.g., via communication devices electrically connected to the host port 104) to the first group of signal pins 108 across the first host data path 118. These signals are sent to the first BOSA unit 208, and ultimately to the first transceiver port 112 and the first SFP+ transceiver module, over the first transceiver data path 116. 10 G signals are also sent from the host port 104 to the second group of signal pins 110 across the second host data path 122. These signals are sent to the second BOSA unit 210, and ultimately to the second transceiver port 114 and the second SFP+ transceiver module, over the second transceiver data path 120. Thus, in the host-to-module direction, the CSFP+ transceiver unit 102 enables two-channel 10 G communications from the host port 104 to the CSFP+ transceiver ports.

In general, when signals are transmitted at enhanced data rates (e.g., 10 G signals), there is a likelihood that the signals at enhanced data rates will experience higher levels of jitter and crosstalk when compared to signals that are transmitted at lower data rates (e.g., one gigabit per second (1 G) signals). Thus, the high jitter tendencies of 10 G signals need to be minimized. For example, 10 G signals typically comprise data packets that are transmitted more closely together than 1 G signals, and if the 10 G signals experience high jitter, signal quality may be significantly degraded. Existing CSFP transceiver devices do not need to account for potential high jitter tendencies by assigning dedicated pins for each signal communication direction in the bidirectional communication path. For example, existing CSFP transceiver devices assign a ground-signal-signal-ground (GSSG) pin configuration only on one data channel. The other data channel in existing CSFP transceiver devices are assigned a signal-signal (SS) pin configuration in the host-to-module direction and signal-signal-ground (SSG) pin configuration in the module-to-host direction. These techniques, however, are effective only at lower data rates (e.g., one gigabit (1 G) Ethernet signals), but are not effective to compensate for jitter tendencies of multi-channel 10 G signals.

The techniques described herein provide an improved pin assignment for the 20-pin SFP+ connector 106 and one or more CDR units to add an additional jitter budget and amplitude budget to combat high-jitter tendencies of bidirectional 10 G data signals sent to and from the CSFP+ transceiver unit 102. To accomplish this, some of the pins of the 20-pin SFP+ connector 106 are assigned with special configurations to ensure that the two-channel 10 G signals are transmitted bidirectionally in the module-to-host and the host-to-module direction.

For example, 10 G signals are transmitted in a first data channel comprising the first transceiver data path 116 and the first host data path 118. These 10 G signals are transmitted bidirectionally, from the first BOSA unit 208 (originally from the first transceiver port 112) to the host port 104 in the module-to-host direction and from the host port 104 to the first BOSA unit 208 (ultimately to the first transceiver port 112) in the host-to-module direction. The 10 G signals in the first data channel are received by the first group of signal pins 108 (e.g., from the first BOSA unit 208 in the module-to-host direction or from the host port 104 in the host-to-module direction). The first group of signal pins 108 comprise first differential signal pair pins 212, second differential signal pair pins 214 and a first ground pin 216. In this example, 10 G signals that are sent in first data channel in the module-to-host direction are received by the first differential signal pair pins 212 of the first group of signal pins 108 across the first transceiver data path 116 from the first BOSA unit 208. These 10 G signals are sent from the first differential signal pair pins 212 to the host port 104 across the first host data path 118. Likewise, 10 G signals that are sent in the first data channel in the host-to-module direction are received by the second differential signal pair pins 214 across the first host data path 118 and are sent from the second differential signal pair pins 214 to the first BOSA unit 208 across the first transceiver data path 116. The first AC ground pin 216 is shared between the first differential signal pair pins 212 and the second differential pair pins 214, as described herein.

When 10 G signals are transmitted in a second data channel, comprising the second transceiver data path 120 and the second host data path 122, the 10 G signals are transmitted bidirectionally from the second BOSA unit 210 (originally from the second transceiver port 114) to the host port 104 in the module-to-host direction and from the host port 104 to the second BOSA unit 210 (ultimately to the second transceiver port 114) in the host-to-module direction. The 10 G signals in the second data channel are received by the second group of signal pins 110 (e.g., from the second BOSA unit 210 in the module-to-host direction or from the host port 104 in the host-to-module direction). The second group of signal pins 110 comprises third differential signal pair pins 218, fourth differential signal pair pins 220, a second ground pin 222, a third ground pin 224, a fourth ground pin 226, and a fifth ground pin 228. In this example, 10 G signals that are sent in the second data channel in the module-to-host direction are received by the third differential signal pair pins 218 across the second transceiver data path 120 from the second BOSA unit 210. These 10 G signals are sent from the third differential signal pair pins 218 to the host port 104 across the second host data path 122. Likewise, 10 G signals that are sent in the second data channel in the host-to-module direction are received by the fourth differential signal pair pins 220 across the second host data path 122 and are sent from the fourth differential signal pair pins 220 to the second BOSA unit 210 across the second transceiver data path 120.

As a result, the pin configuration for the first group of signal pins 108 has a signal-signal-ground (SSG) pin assignment for signals in the first data channel for each of the bidirectional communications. That is, for the module-to-host 10 G communications in the first data channel, the first differential signal pair pins 212 and the first ground pin 216 constitute an SSG pin arrangement. Likewise, for the host-to-module 10 G communications in the first data channel, the second differential signal pair pins 214 and the first ground pin 216 constitute an SSG pin arrangement.

On the other hand, the pin configuration for the second group of signal pins 110 has a ground-signal-signal-ground (GSSG) pin assignment for signals in the second data channel for each of the bidirectional communications. That is, for the module-to-host 10 G communications in the second data channel, the second ground pin 222, the third differential signal pair pins 218, and the third ground pin 224 constitute a GSSG pin arrangement. Likewise, for the host-to-module 10 G communications in the second data channel, the fourth ground pin 226, the fourth differential signal pair pins 220, and the fifth ground pin 228 constitute a GSSG pin arrangement.

As stated above, the first transceiver data path 116 also comprises the first CDR unit 202 and the second CDR unit 204. These CDR units, along with the DC blocking capacitors allow for the first transceiver data channel to compensate for signal impairments in the 10 G signals that may result from the SSG pin assignments. For example CDR can compensate for or "clean up" any electrical degradation of the data signals resulting from the SSG pin assignments.

Figure 3:
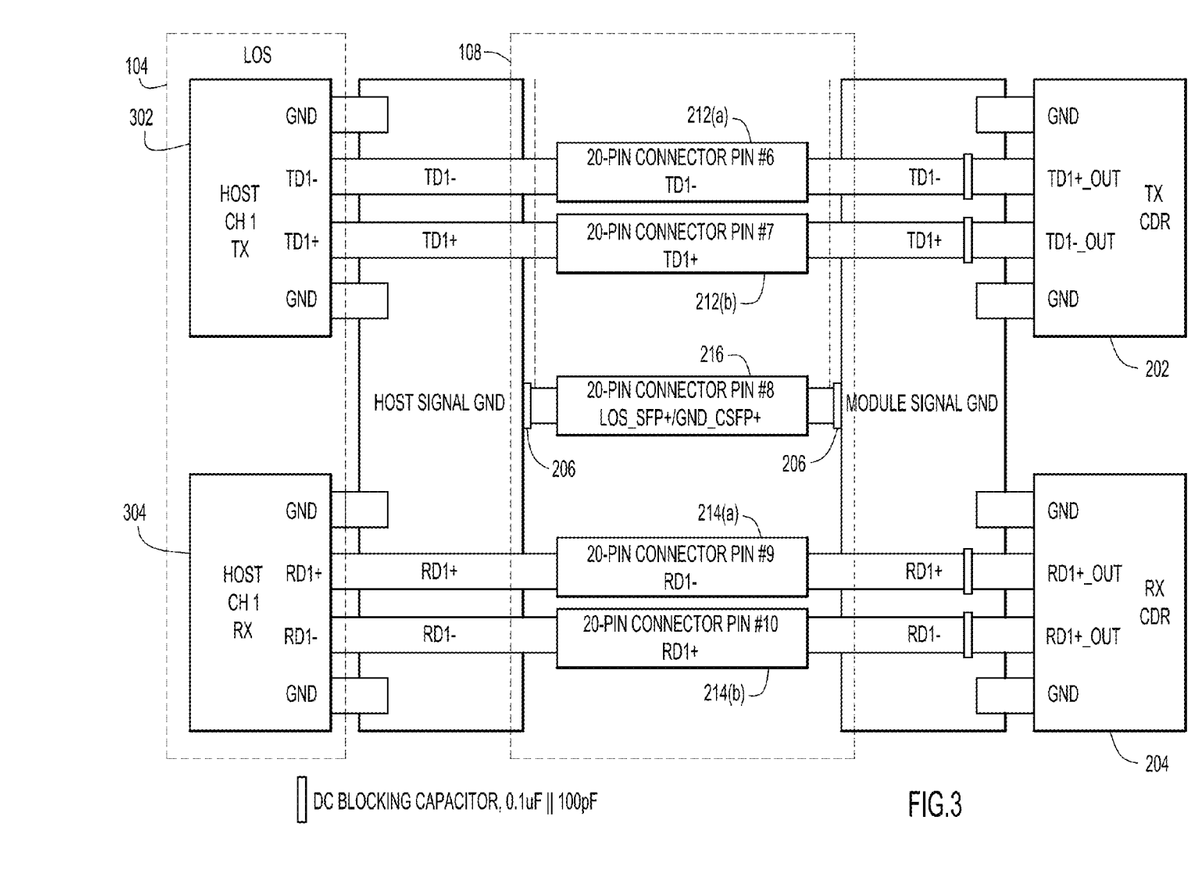
FIG. 3 is an example diagram showing the pin assignment configuration of a first group of signal pins of the transceiver unit.

Reference is now made to FIG. 3, which shows an example pin assignment configuration of the first group of signal pins 108 of the 20-pin SFP+ connector 106. Though FIG. 3 shows pins 6 to 10 of the 20-pin SFP+ connector 106, it should be appreciated that any of the pins of the 20-pin SFP+ connector 106 may be used. As described above, the first group of signal pins 108 comprises the first differential signal pair pins 212. The first differential signal pair pins 212 comprise two transmit signal pins, shown at reference numeral 212(a) and 212(b). The transmit signal pins 212(a) and 212(b) are configured to enable 10 G signals in the module-to-host direction in the first data channel. For example, the transmit signal pins 212(a) and 212(b) may receive 10 G signals from the first CDR unit 202 (originating from the first transceiver port 112 and sent to the first BOSA unit 208 and the first CDR unit 202) and may send these signal to the host port 104 (e.g., at a transmit port of the host port, shown at reference numeral 302).

FIG. 3 also shows two receive signal pins at reference numeral 214(a) and 214(b), which constitute the second differential signal pair pins 214. The receive signal pins 214(a) and 214(b) are configured to enable 10 G signals in the host-to-module direction in the first data channel. For example, the receive signal pins 214(a) and 214(b) may receive 10 G signals from the host port 104 (e.g., from a receive port 304 of the host port 104) and may send these signals to the second CDR unit 202 (ultimately to the second BOSA unit 210, the second transceiver port 114). In addition, FIG. 3 shows the first ground pin 216, which acts as a shared alternating current (AC) ground pin for signals received at the transmit signal pins 212(a) and 212(b) and for signals received at the receive signal pins 214(a) and 214(b).

It should be appreciated that the CSFP+ host port 104 is able to support data communications originating from a number of transceiver modules at a variety of data rates. For example, the CSFP+ host port 104 may be configured to receive 1 G data communications using SFP transceiver modules, 1 G communications from two-channel CSFP transceiver modules, 10 G communications from SFP+ transceiver modules and two-channel 10 G communications from other CSFP+ transceivers. Thus, the CSFP+ transceiver unit 102 is backwards compatible (e.g., input/output (I/O) compatible or pin compatible) with SFP, SFP+ and CSFP transceiver modules, while being able to receive enhanced data communications. Furthermore, it should be appreciated that the CSFP+ transceiver unit 102 increases (i.e., doubles) the port density by allowing equipment vendors to pack two ports into one SFP+ port.

Figure 4:
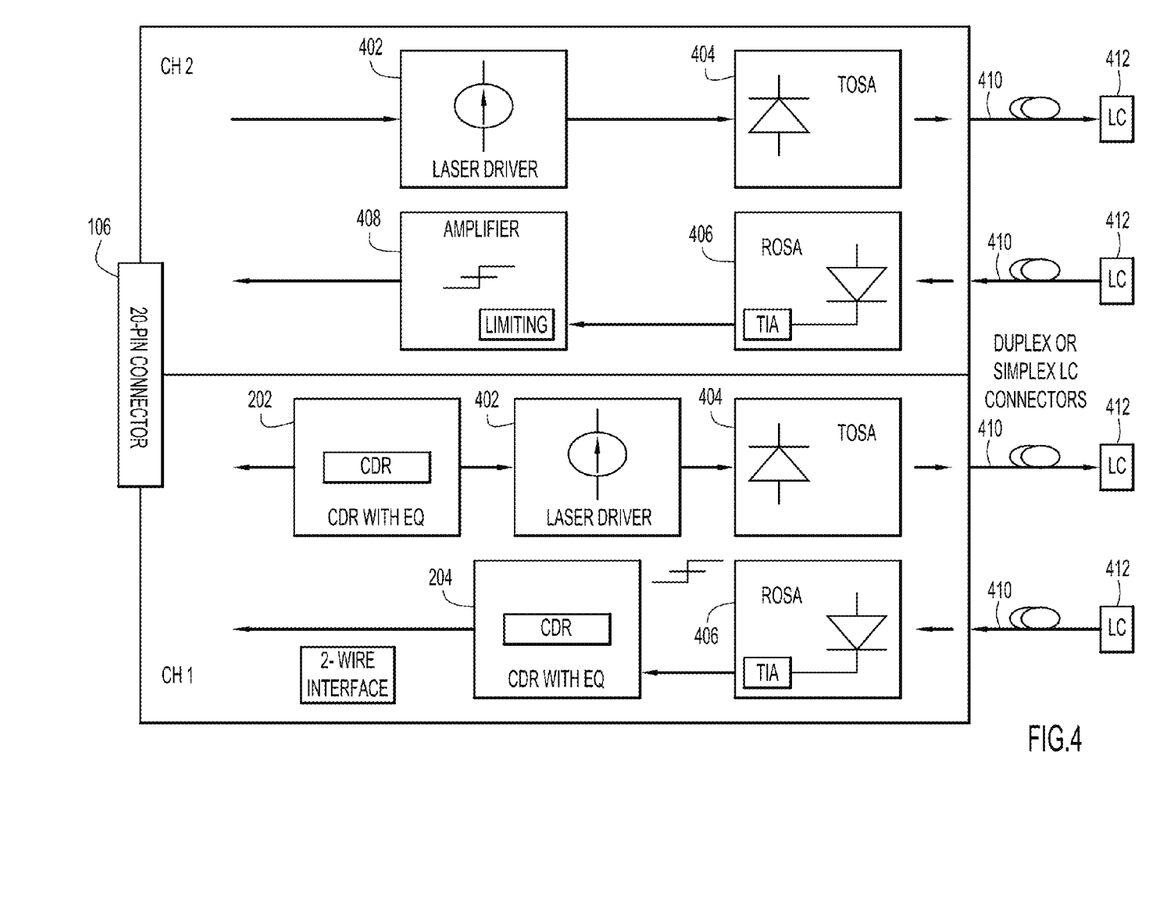
FIG. 4 is an example diagram of the transceiver unit in a pigtail connector configuration.

Reference is now made to FIG. 4, which shows an example of the CSFP+ transceiver unit in a pigtail connection configuration. FIG. 4 shows the first data channel comprising the first CDR unit 202, a laser driver unit 402 coupled to the first CDR unit 202 and a transmitter optical sub-assembly (TOSA) unit. The first data channel also comprises the second CDR unit 202 and a receiver optical sub-assembly (ROSA) unit. The second channel comprises another of the laser drive unit 404 coupled to another TOSA, and also comprises an amplifier unit 408 coupled to another ROSA 406. Each of the first data channel and the second data channel is coupled to two fiber channels 410 in a pigtail configuration that are configured to deliver 10 G signals to optical connectors 410. The optical connectors 410 may be single fiber optical connectors (simplex) or dual fiber optical connectors (duplex)

Figure 5:
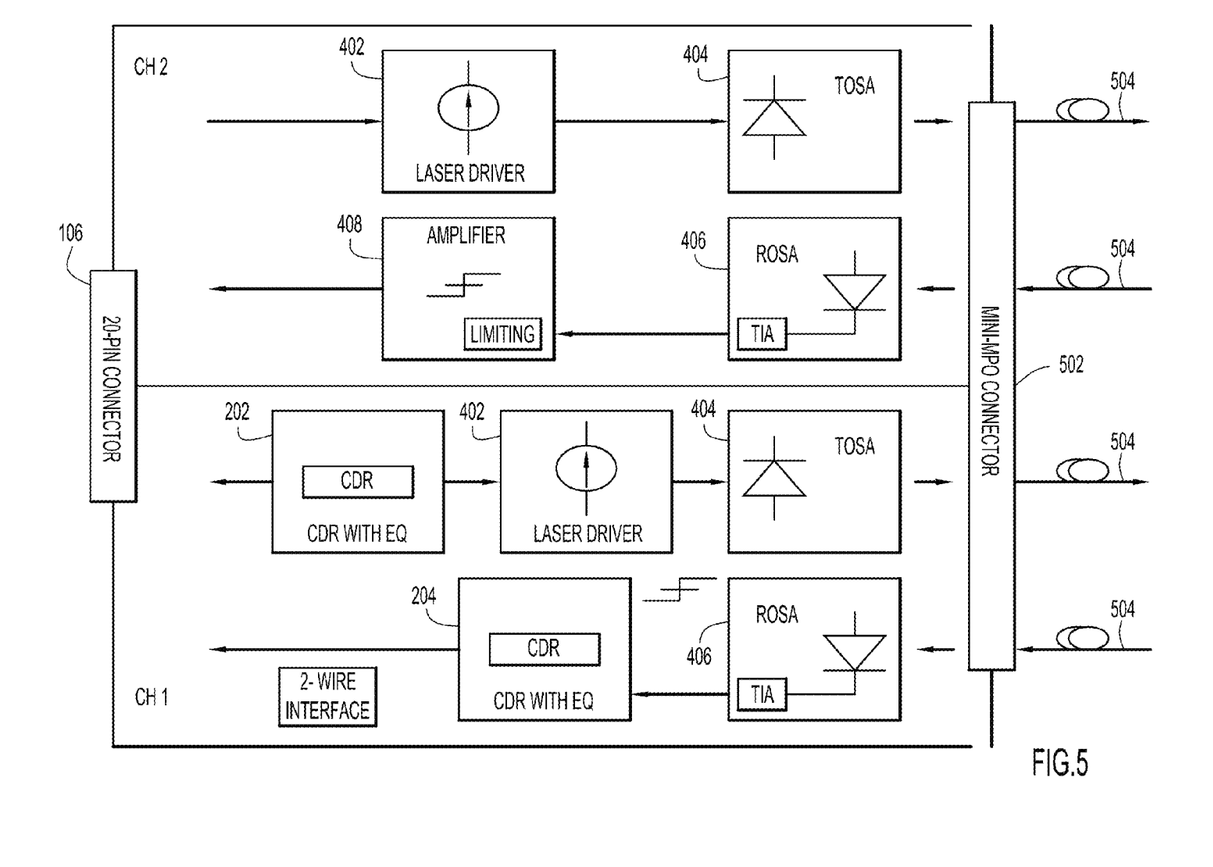
FIG. 5 is an example diagram of the transceiver unit with mini-multi-fiber push on (mini-MPO) connectors.

Reference is now made to FIG. 5, which shows an example of the CSFP+ transceiver unit 102 in a mini-multi-fiber-push on (mini-MPO) configuration. FIG. 5 shows the first data channel and the second data channel comprising the components described in FIG. 4 above. In addition, FIG. 5 shows a mini-MPO connector port 502 that is coupled to fiber channels 504. The mini-MPO connector port 502 may be coupled to the first transceiver port 112 and the second transceiver port 114 and may be configured to interface with mini-MPO connectors.

Figure 6:
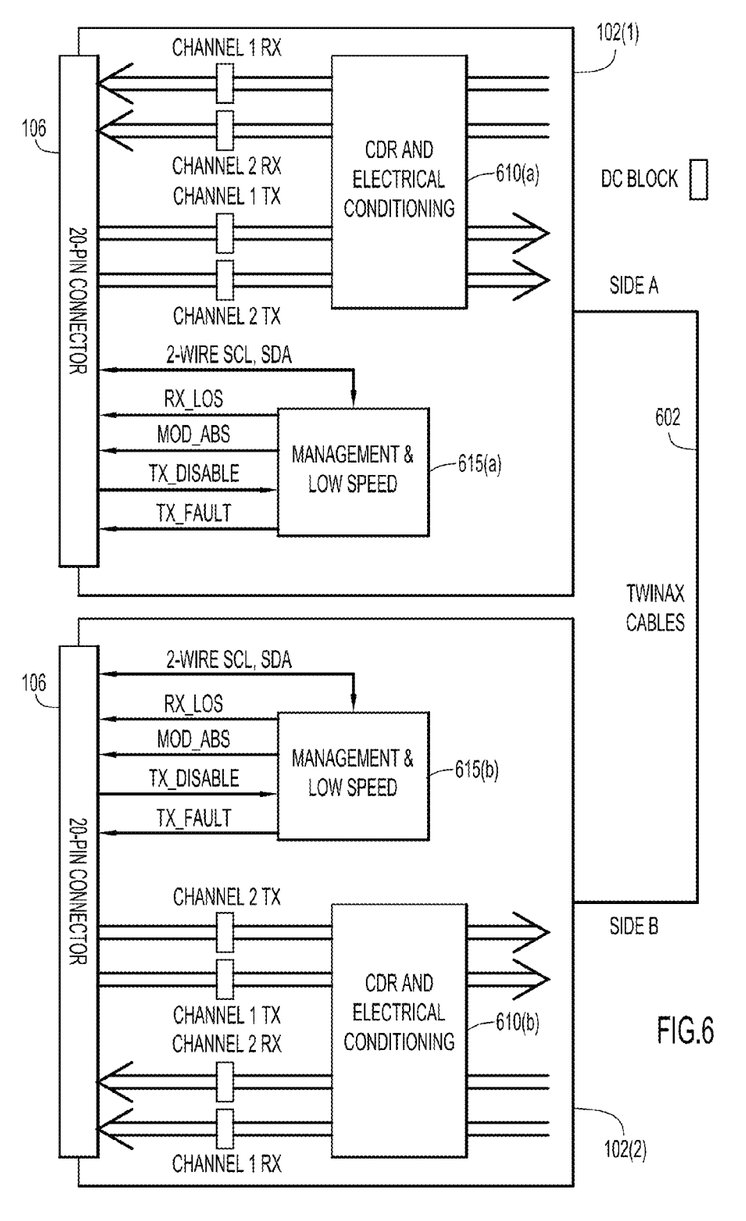
FIG. 6 is an example diagram of a copper cable block assembly connecting two or more transceiver units.

Reference is now made to FIG. 6, which shows an example of a copper block assembly connecting two or more of the CSFP+ transceiver units 102. A first one of the CSFP+ transceiver unit 102 is shown at reference numeral 102(1) and a second one of the CSFP+ transceiver unit is shown at reference numeral 102(2). It should be appreciated that any number of CSFP+ transceiver units may be depicted in FIG. 6. The first CSFP+ transceiver unit 102(1) is configured to interface with the second CSFP+ transceiver unit 102(2) using a copper cable (e.g., a twinaxial or "twinax" cable) 602. In one example, the reach for the copper cable 602 may be beyond 10 meters. Thus, copper cable connected to the first CSFP+ transceiver unit 102(1) may send and receive 10 G communications to a host port connected to the second CSFP+ transceiver unit 102(2) across the copper cable 602. The first CSFP+ transceiver unit 102(1), as shown, further comprises a first CDR and electrical conditioning unit 610(a) and a management and low speed unit 615(a) coupled to the signal pins 106. Similarly, the second CSFP+ transceiver unit 102(2), as shown, further comprises a second CDR and electrical conditioning unit 610(b) and a management and low speed unit 615(b) coupled to the signal pins 106.

Figure 7:
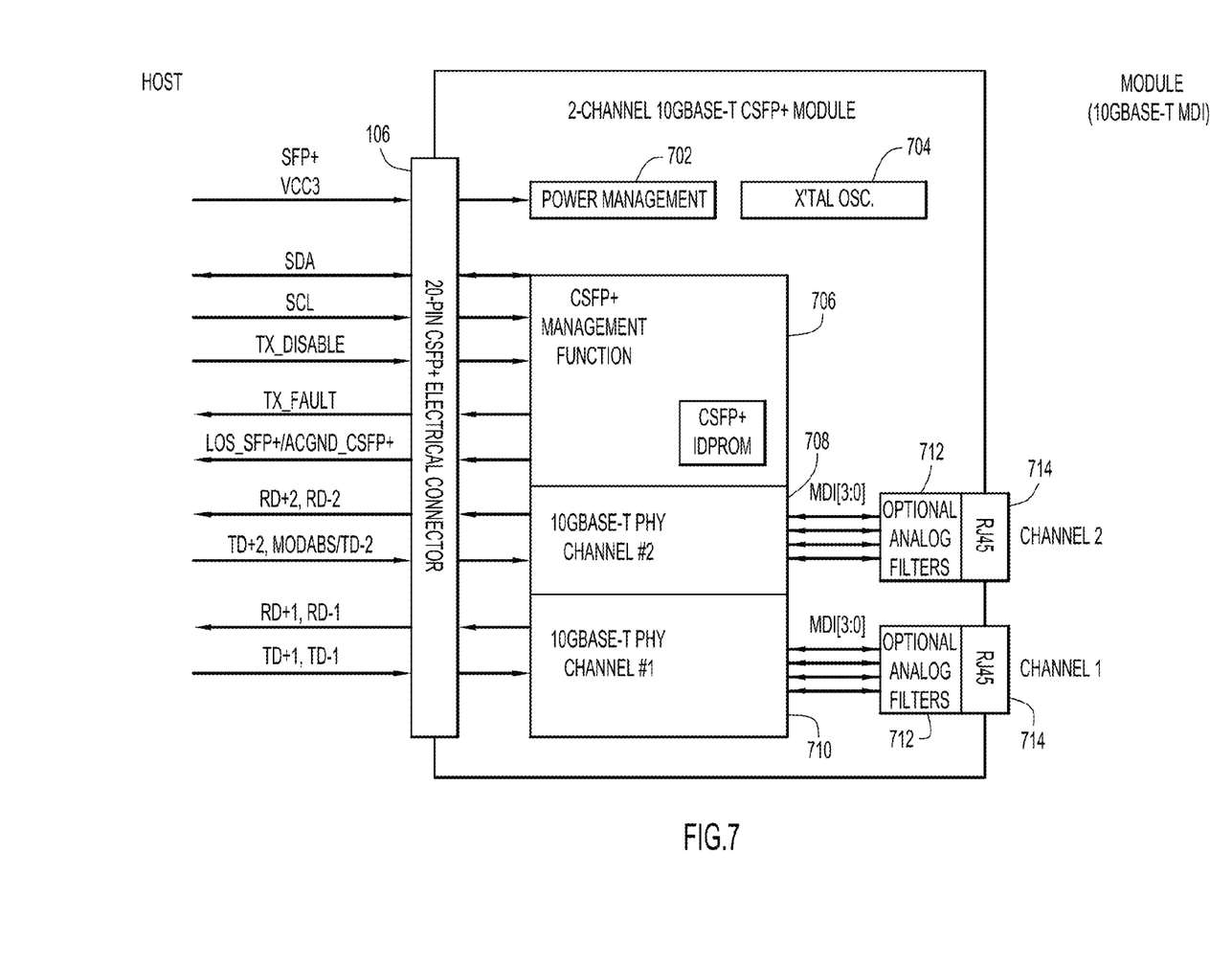
FIG. 7 is an example diagram of the transceiver unit configured as a 10 GBase-T transceiver unit.

Reference is now made to FIG. 7, which shows an example configuration of the CSFP+ transceiver unit 102 as a 10 GBase-T transceiver unit in compliance with the Institute of Electrical and Electronic Engineers (IEEE) 802.3an-2006 standard. FIG. 7 shows the 10 GBase-T enabled CSFP+ transceiver unit 102 comprising a power management unit 702, an oscillator unit 704 and a CSFP+ management unit 706. The 10 GBase-T enabled CSFP+ transceiver unit also comprises a first 10 GBase-T PHY or processor 708 configured to send and receive 10 GBase-T signals over the first data channel (e.g., to and from the first transceiver port 112 and the host port 104) and a second 10 GBase-T PHY or processor 710 configured to send and receive 10 GBase-T signals over the second data channel (e.g., to and from the second transceiver port 114 and the host port 104). Additionally, the 10 GBase-T enabled CSFP+ transceiver unit also comprises optional analog filters 712 coupled to registered jack 45 (RJ45) ports 714.

Figure 8:
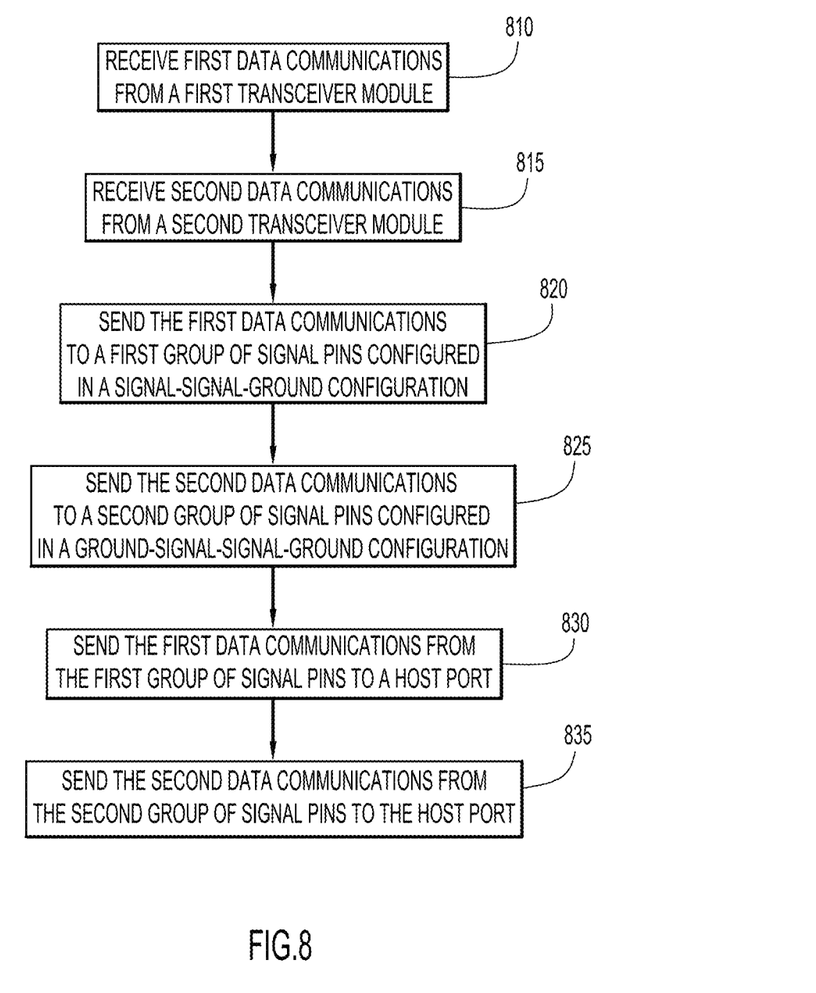
FIG. 8 is an example flow chart depicting operations performed by the transceiver unit for module-to-host communications.

Reference is now made to FIG. 8, which shows an example flow chart depicting operations performed by the CSFP+ transceiver unit 102 for module-to-host communications. At operation 810, the CSFP+ transceiver unit 102 receives first data communications from a first transceiver module. At 815, the CSFP+ transceiver unit 102 receives second data communications from a second transceiver module. The CSFP+ transceiver unit 102 then sends the first data communications, at operation 820, to the first group of signal pins 108 via, e.g., one or more CDR units. The first group of signal pins 108 is configured in a SSG pin configuration. At operation 825, the CSFP+ transceiver unit 102 sends the second data communications to the second group of signal pins 110 configured in a GSSG pin configuration. The first data communications are sent, at operation 830, from the first group of signal pins 108 to the host port 104, and at operation 835, the second data communications are sent from the second group of signal pins 110 to the host port 104.

Figure 9:
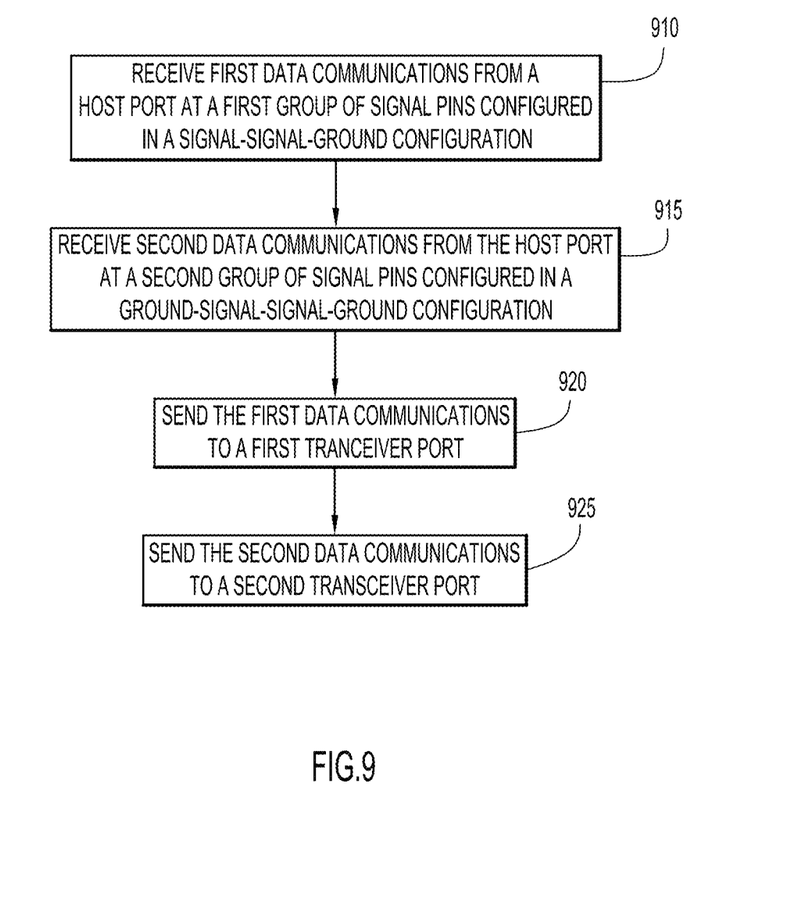
FIG. 9 is an example flow chart depicting operations performed by the transceiver unit for host-to-module communications.

Reference is now made to FIG. 9, which shows an example flow chart depicting operations performed by the CSFP+ transceiver unit 102 for host-to-module communications. At operation 910, the CSFP+ transceiver unit 102 receives first data communications from the host port 104 at the first group of signal pins 108 configured in the SSG pin configuration. The CSFP+ transceiver unit 102, at operation 915, receives second data communications from the host port 104 at the second group of signal pins 110 configured in the GSSG pin configuration. The first data communications are sent, at operation 920, to the first transceiver port 112 via, e.g., one or more CDR units. At operation 925, the second data communications are sent to the second transceiver port 114.

It should be appreciated that the techniques described above in connection with all embodiments may be performed by one or more computer readable storage media that is encoded with software comprising computer executable instructions to perform the methods and steps described herein. For example, the operations performed by the CSFP+ transceiver unit 102 may be performed by one or more computer or machine readable storage media or device executed by a processor and comprising software, hardware or a combination of software and hardware to perform the techniques described herein.

In sum, an apparatus is provided comprising: a first transceiver port configured to receive first data communications across a first transceiver channel; a second transceiver port configured to receive second data communications across a second transceiver channel; and a set of signal pins configured to receive the first data communications from the first transceiver port at a first group of signal pins and to receive the second data communications from the second transceiver port at a second group of signal pins, wherein the first group of signal pins comprise signal pins in a signal-signal-ground configuration and wherein the second group of signal pins comprise signal pins in a ground-signal-signal-ground configuration.

In addition, an apparatus is provided comprising: a set of signal pins configured to receive first data communications from a host port at a first group of signal pins and to receive second data communications from the host port at a second group of signal pins, wherein the first group of signal pins comprise signal pins in a signal-signal-ground configuration and wherein the second group of signal pins comprise signal pins in a ground-signal-signal-ground configuration; a first transceiver port configured to receive the first data communications from the first group of signal pins; and a second transceiver port configured to receive the second data communications from the second group of signal pins.

Furthermore, a method is provided comprising: at a transceiver unit, receiving first data communications at a first transceiver port; receiving second data communications at a second transceiver port; sending the first data communications to a first group of signal pins configured in a signal-signal-ground configuration; sending the second data communications to a second group of signal pins configured in a ground-signal-signal-ground configuration; and sending the first data communications from the first group of signal pins to a host port and from the second group of signal pins to the host port.

In addition, a method is provided comprising: at a transceiver unit, receiving first data communications from a host port at a first group of signal pins configured in a signal-signal-ground configuration; receiving second data communications from the host port at a second group of signal pins configured in a ground-signal-signal-ground configuration; sending the first data communications to a first transceiver port; and sending the second data communications to a second transceiver port.

The above description is intended by way of example only. Various modifications and structural changes may be made therein without departing from the scope of the concepts described herein and within the scope and range of equivalents of the claims.

What is claimed is:

1. An apparatus comprising:
   a first transceiver port configured to send and receive first data communications across a first transceiver channel;
   a second transceiver port configured to send and receive second data communications across a second transceiver channel; and
   a set of signal pins configured to receive the first data communications from the first transceiver port at a first group of signal pins and to receive the second data communications from the second transceiver port at a second group of signal pins,
   wherein the first group of signal pins is arranged in a signal-signal-ground configuration on a pin connector and comprises a first pair of differential signal pins, a second pair of differential signal pins and a first ground pin shared between the first pair and the second pair; and
   wherein the second group of signal pins is arranged in a ground-signal-signal-ground configuration on the pin connector and comprises a third pair of differential signal pins, a fourth pair of differential signal pins and a plurality of ground pins.

2. The apparatus of claim 1, wherein the first group of signal pins is configured to receive the first data communications at a data rate of ten gigabits per second and wherein the second group of signal pins are configured to receive the second data communications at a data rate of ten gigabits per second.

3. The apparatus of claim 1, wherein the set of signal pins is configured to interface with a host port that supports one of a small form-factor pluggable (SFP) transceiver module, a compact small-form-factor pluggable (CSFP) transceiver module or an enhanced CSFP (CSFP+) transceiver module.

4. The apparatus of claim 1, further comprising a clock data recovery (CDR) unit configured to receive data packets of the first data communication and to buffer the data packets of the first data communication.

5. The apparatus of claim 1, wherein the first transceiver port and the second transceiver port are coupled to two pairs of fibers in a pigtail configuration for receiving the first data communications and the second data communications.

6. The apparatus of claim 1, wherein the first transceiver port and the second transceiver port are configured to interface with a mini-multi-fiber push on (mini-MPO) connector to receive the first data communications and the second data communications.

7. An apparatus comprising:
   a set of signal pins configured to receive first data communications from a host port at a first group of signal pins and to receive second data communications from the host port at a second group of signal pins, wherein the first group of signal pins is arranged in a signal-signal-ground configuration on a pin connector and comprises a first pair of differential signal pins, a second pair of differential signal pins and a first ground pin shared between the first pair and the second pair and wherein the second group of signal pins is arranged in a ground-signal-signal-ground configuration on the pin connector and comprises a third pair of differential signal pins, a fourth pair of differential signal pins and a plurality of ground pins;
   a first transceiver port configured to receive the first data communications from the first group of signal pins; and
   a second transceiver port configured to receive the second data communications from the second group of signal pins.

8. The apparatus of claim 7, wherein the first transceiver port is coupled to a first ten gigabit data channel and wherein the second transceiver port is coupled to a second ten gigabit data channel.

9. The apparatus of claim 7, wherein the first group of signal pins is configured to receive the first data communications at a data rate of ten gigabits per second and wherein the second group of signal pins is configured to receive the second data communications at a data rate of ten gigabits per second.

10. The apparatus of claim 7, further comprising a clock data recovery (CDR) unit configured to receive data packets of the first data communication and to buffer the data packets of the first data communication.

11. A method comprising:
    at a transceiver unit, receiving first data communications at a first transceiver port;
    receiving second data communications at a second transceiver port;
    sending the first data communications to a first group of signal pins arranged in a signal-signal-ground configuration on a pin connector of the transceiver unit and comprising a first pair of differential signal pins, a second pair of differential signal pins and a first ground pin shared between the first pair and the second pair;
    sending the second data communications to a second group of signal pins arranged in a ground-signal-signal-ground configuration on the pin connector of the transceiver unit and comprising a third pair of differential signal pins, a fourth pair of differential signal pins and a plurality of ground pins; and
    sending the first data communications from the first group of signal pins to a host port and sending the second data communications from the second group of signal pins to the host port.

12. The method of claim 11, wherein receiving the first data communications comprises receiving the first data communications at a data rate of ten gigabits per second and wherein receiving the second data communications comprises receiving the second data communications at the data rate of ten gigabits per second.

13. The method of claim 11, further comprising buffering data packets of the first data communication at a clock data recovery (CDR) unit.

14. The method of claim 11, wherein sending the first data communications comprises sending the first data communications from the first group of signal pins to a host port and from the second group of signal pins to the host port that supports one of a small form-factor pluggable (SFP) transceiver module, a compact small form-factor pluggable (CSFP) transceiver module or an enhanced CSFP (CSFP+) transceiver module.

15. The method of claim 11, wherein the first transceiver port and the second transceiver port are coupled to two pairs of fibers in a pigtail configuration for receiving the first data communications and the second data communications.

16. The method of claim 11, wherein the first transceiver port and the second transceiver port are configured to interface with a mini-multi-fiber push on a (mini-MPO) connector to receive the first data communications and the second data communications.

17. A method comprising:
  at a transceiver unit, receiving first data communications from a host port at a first group of signal pins arranged in a signal-signal-ground configuration on a pin connector of the transceiver unit an comprising a first pair of differential signal pins, a second pair of differential signal pins and a first ground pin shared between the first pair and the second pair;
  receiving second data communications from the host port at a second group of signal pins arranged in a ground-signal-signal ground configuration on the pin connector of the transceiver unit and comprising a third pair of differential signal pins, a fourth pair of differential signal pins and a plurality of ground pins;
  sending the first data communications to a first transceiver port; and
  sending the second data communications to a second transceiver port.

18. The method of claim 17, wherein receiving the first data communications at the first group of signal pins comprises receiving the first data communications at a data rate of ten gigabits per second, and wherein receiving the second data communications at the second group of signal pins comprises receiving the second data communications at the data rate of ten gigabits per second.

19. The method of claim 17, wherein receiving the first data communications and the second data communications from the host port comprises receiving data communications from the host port that supports one of a small form-factor pluggable (SFP) transceiver module, a compact small-form-factor pluggable (CSFP) transceiver module or an enhanced CSFP (CSFP+) transceiver module.

20. The method of claim 17, further comprising buffering data packets of the first data communication.

\* \* \* \* \*